United States Patent [19]
Brodsky et al.

[11] Patent Number: 6,160,568
[45] Date of Patent: Dec. 12, 2000

[54] LASER MARKING SYSTEM AND METHOD OF ENERGY CONTROL

[75] Inventors: Mark A. Brodsky, Monte Sereno; David F. Welch, Menlo Park; Yong Yim, San Jose, all of Calif.

[73] Assignee: SDL, Inc., San Jose, Calif.

[21] Appl. No.: 09/085,142

[22] Filed: May 26, 1998

Related U.S. Application Data

[60] Provisional application No. 60/047,750, May 27, 1997.

[51] Int. Cl.$^7$ ..................................................... B41J 2/435
[52] U.S. Cl. ........................ 347/247; 347/246; 347/238; 385/126; 372/70; 372/75
[58] Field of Search .................................... 347/237, 238, 347/239, 247, 255, 246; 385/126, 123; 359/341; 372/6, 25, 50, 24, 26, 33, 75, 70

[56] References Cited

U.S. PATENT DOCUMENTS

| | | | |
|---|---|---|---|
| 4,522,656 | 6/1985 | Kuhn-Kuhnenfeld et al. | 219/121.66 |
| 4,652,722 | 3/1987 | Stone et al. | 219/121 |
| 4,727,235 | 2/1988 | Stamer et al. | 219/121.68 |
| 4,963,714 | 10/1990 | Adamski et al. | 219/121.63 |
| 5,225,923 | 7/1993 | Montagu | 359/199 |
| 5,263,036 | 11/1993 | DeBernardi et al. | 372/6 |
| 5,268,978 | 12/1993 | Po et al. | 385/33 |
| 5,329,090 | 7/1994 | Woelki et al. | 219/121.68 |
| 5,374,973 | 12/1994 | Maxham et al. | 359/341 |
| 5,418,880 | 5/1995 | Lewis et al. | 385/123 |
| 5,694,408 | 12/1997 | Bott et al. | 372/6 |
| 5,719,372 | 2/1998 | Togari et al. | 219/121.61 |
| 5,734,412 | 3/1998 | Hasebe et al. | 347/247 |
| 5,799,029 | 8/1998 | Rossi et al. | 372/50 |
| 5,867,305 | 2/1999 | Waarts et al. | 359/341 |
| 5,887,009 | 3/1999 | Mandella et al. | 372/6 |

FOREIGN PATENT DOCUMENTS

| | | |
|---|---|---|
| 0 395 277 | 10/1990 | European Pat. Off. . |
| WO96/16767 | 6/1996 | WIPO . |
| WO96/41404 | 12/1996 | WIPO . |

OTHER PUBLICATIONS

Mark Wegmuller et al., entitled "Diode–Pumped Passively Mode–Locked $Nd^{3+}$ –Doped Fluoride Fiber Laser Emitting at 1.05 micron: Novel Results" *IEEE Journal of Quantum Electronics*, vol. 34, No. 1, Jan., 1998.

*Primary Examiner*—N. Le
*Assistant Examiner*—Hai C. Pham
*Attorney, Agent, or Firm*—W. Douglas Carothers, Jr.

[57] ABSTRACT

A laser marking system comprises a high power fiber laser consisting of a double clad fiber having a doped core surrounded by an inner pump cladding and providing an optical output for marking; a high power laser diode source for pumping the double clad fiber laser via an input into the inner pump cladding; an optical scanner coupled to receive the marking output from the double clad fiber laser to scan the output over a surface of an article to be marked by sweeping the marking output in one, two or three dimensions to form strokes, the completion of which comprises indicia to be marked the article surface; and a controller to control the operation of the scanner in synchronism with the modulation of the laser diode pump source to initiate the marking output and sweep and modulate the marking optical output in one, two or three dimensions to form strokes comprising the indicia. A main advantage of the fiber laser marking system over $CO_2$ and YAG laser marking systems is the ability to provide modulation via the semiconductor laser diode at the input to the marking laser rather than having to modulate the optical power beam at the output of the marking laser, such as through an acusto-optic modulator, which provides for a pulse of non-uniform stability across the pulse width with a substantially decrease in the amount of power in the modulated beam output. Also disclosed is circuitry to dampen the ON-time rise of a current signal input for operation of the laser diode pump source to improve the ON-time quality of the marking optical output created by the double clad fiber marking laser.

55 Claims, 5 Drawing Sheets

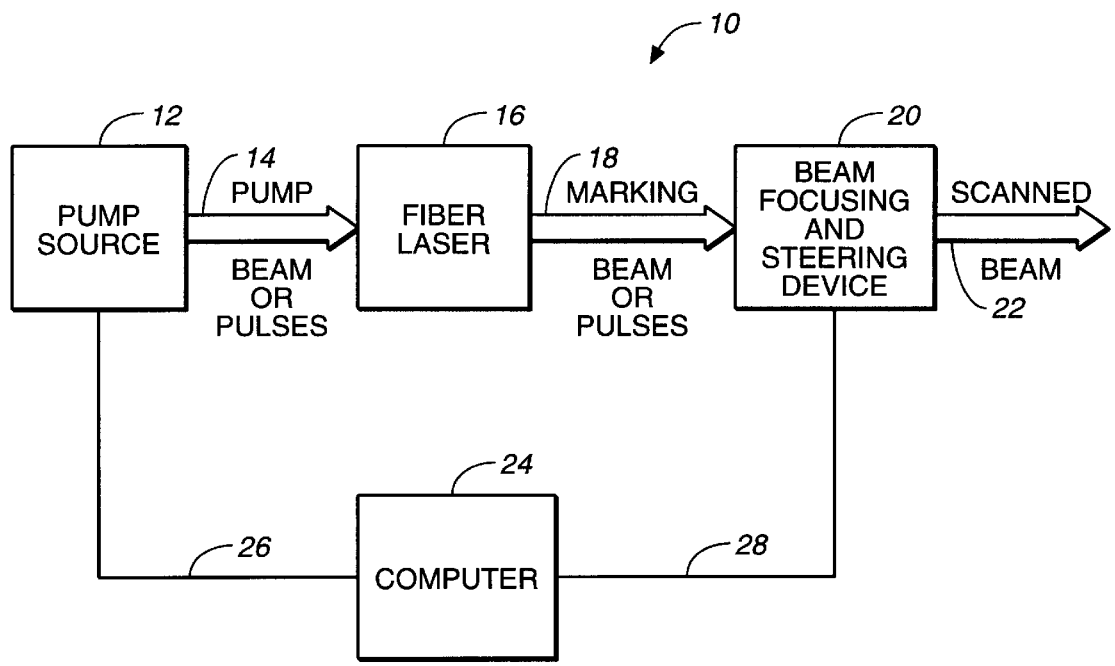
FIG._1
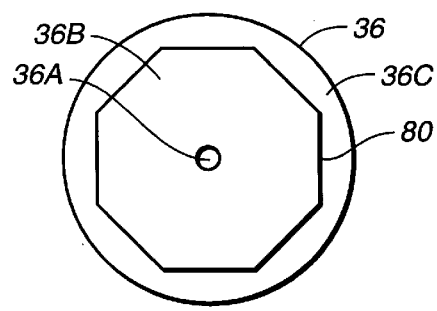
FIG._3

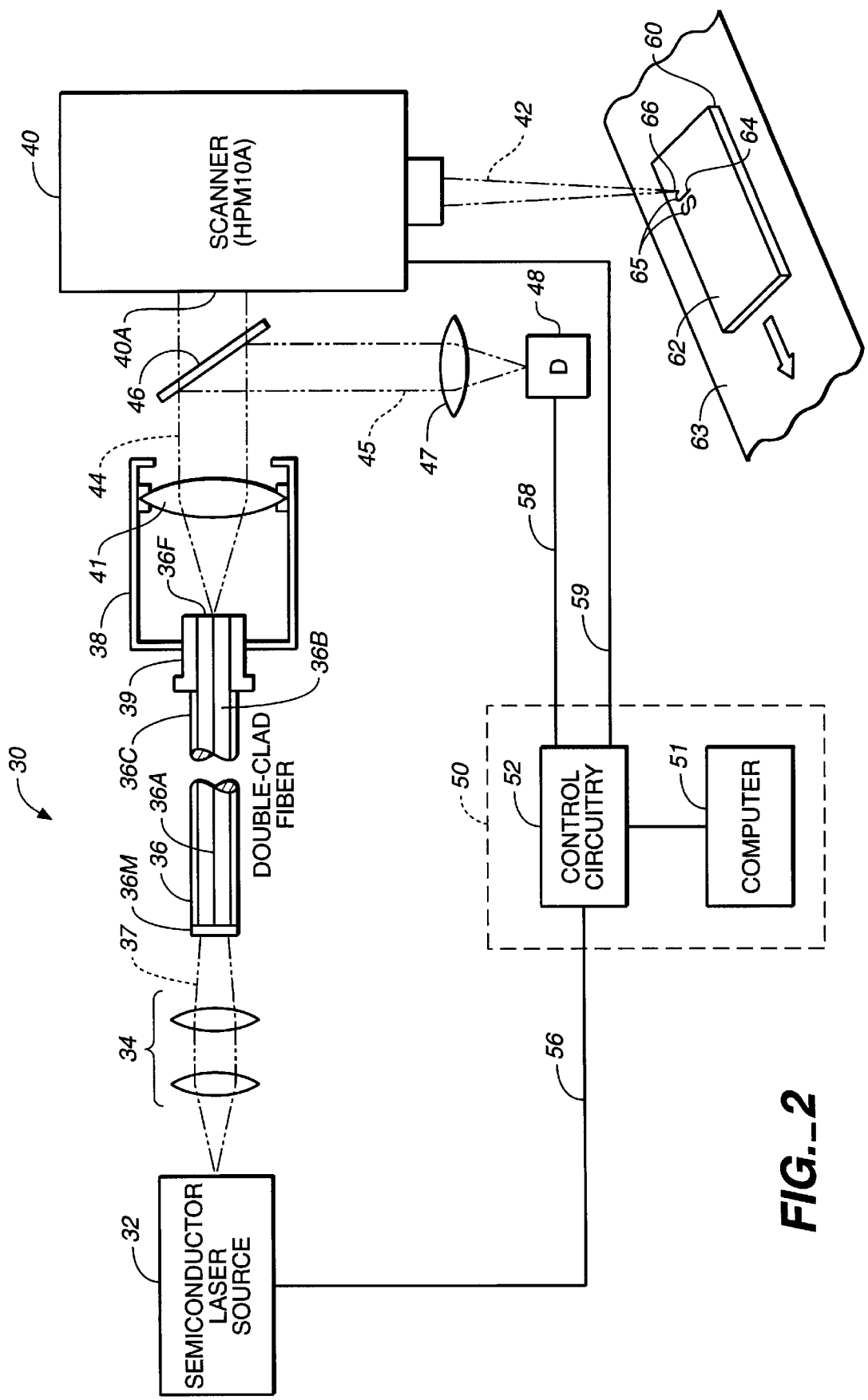
FIG._2

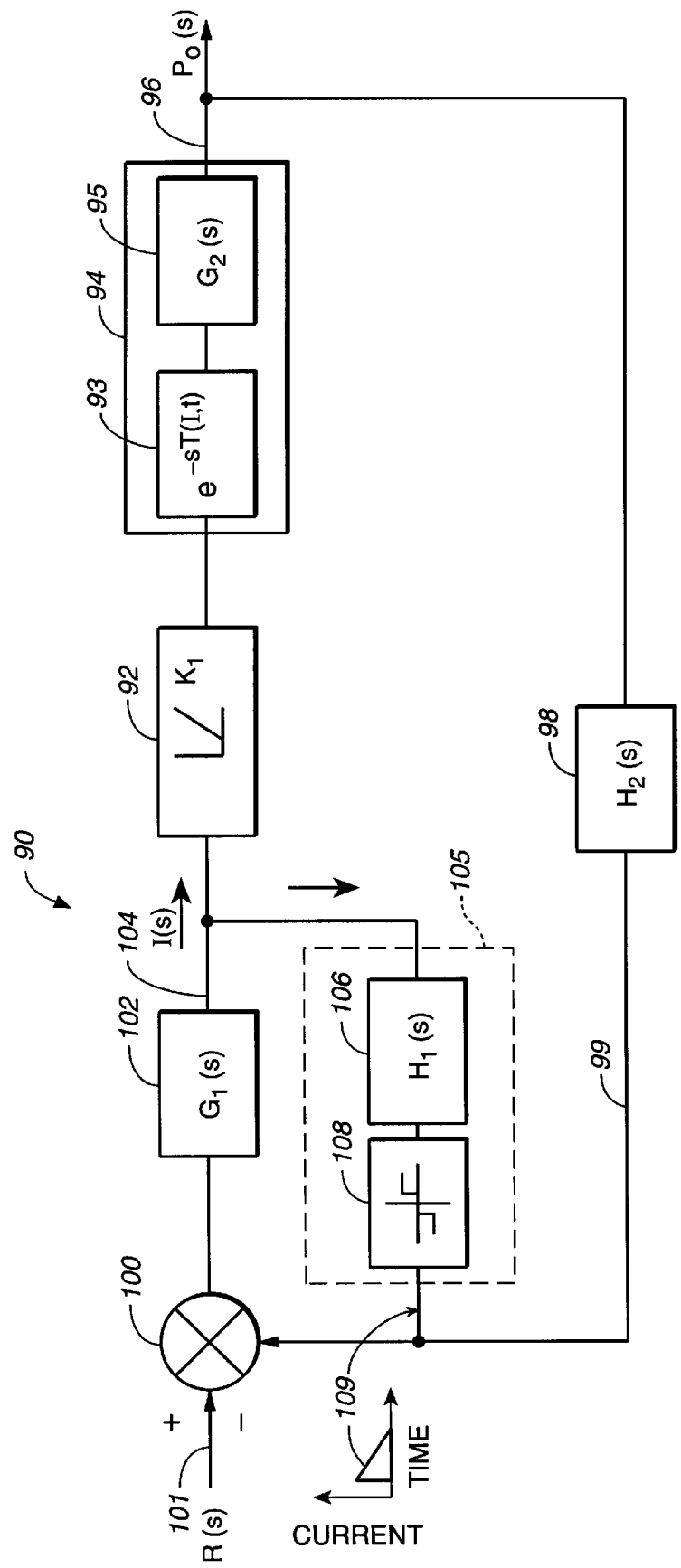
FIG._4

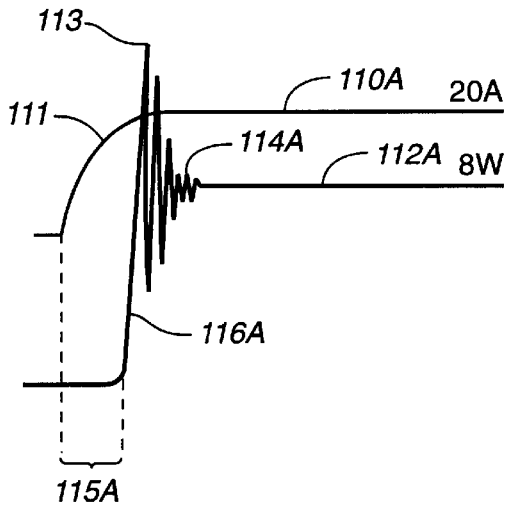
FIG._5A
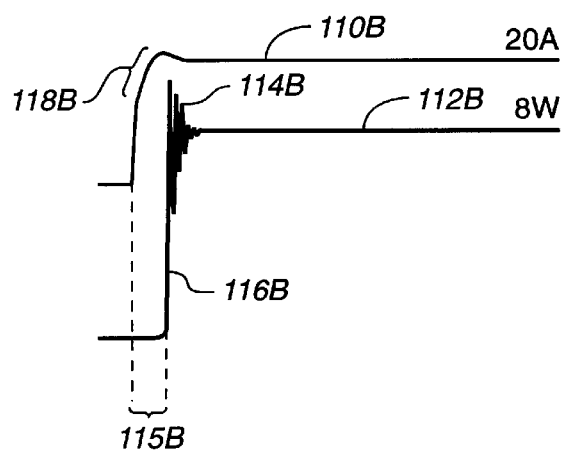
FIG._5B
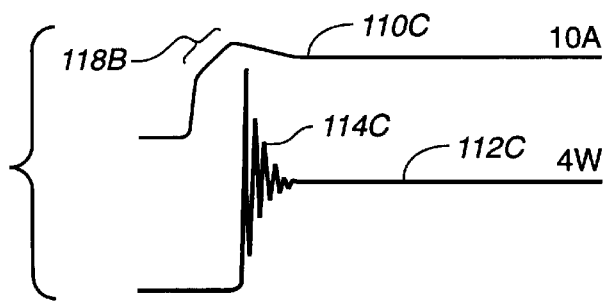
FIG._5C
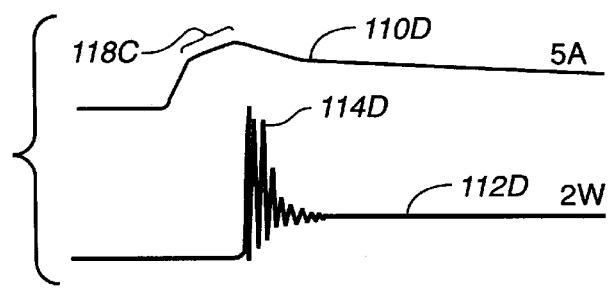
FIG._5D

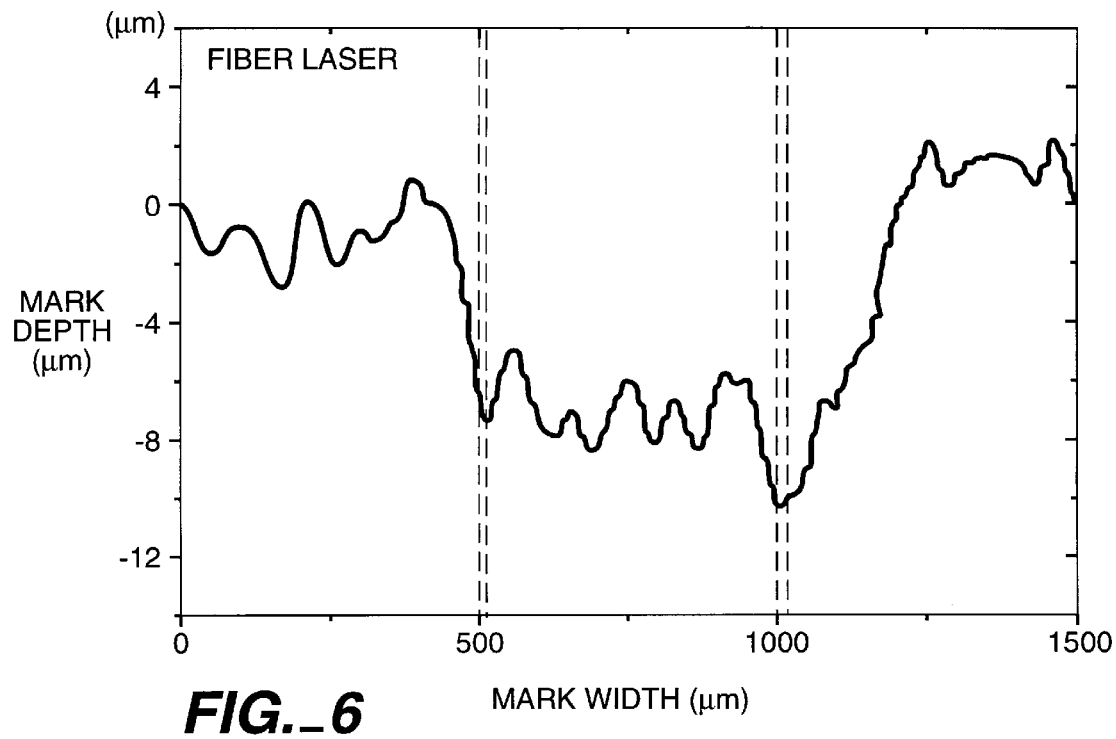
FIG._6
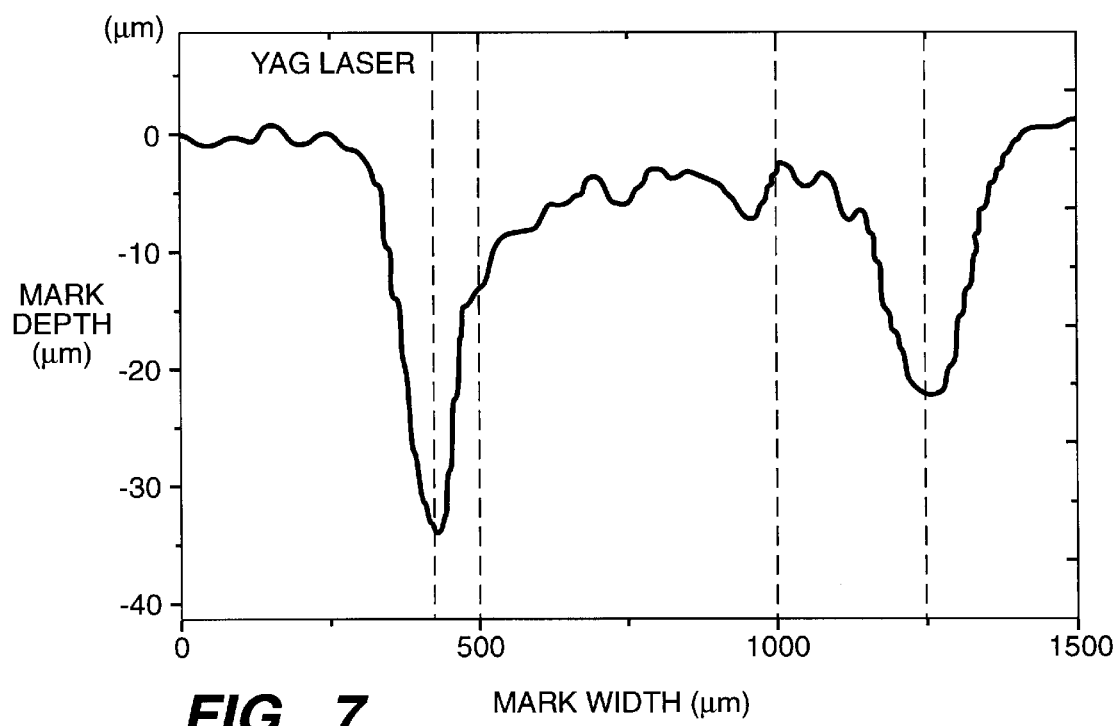
FIG._7
(PRIOR ART)

LASER MARKING SYSTEM AND METHOD OF ENERGY CONTROL

REFERENCE TO RELATED APPLICATION

This application claims priority benefits of prior filed copending provisional patent application, Ser. No. 60/047,750, filed May 27, 1997, which is incorporated herein by its reference.

FIELD OF THE INVENTION

This invention relates generally to a laser marking system and more particularly to fiber laser marking systems operated cw or pulsed for marking surfaces of objects with information or data, hereinafter referred to as "indicia" which includes, for example, alphanumeric information, letters, words, personal or company logos, tradenames, trademarks, data or batch codes, numbers, symbols, patterns, article coding or identification, personalized signatures, and the like.

BACKGROUND OF THE INVENTION

Laser marking systems have been in existence as early as 1971 for marking indicia on surfaces of articles. A major use of laser marking of articles is for marking an article or product or a product package particularly with respect to high volume manufacturing lines, so as to take advantage of marking these goods "on-the-fly". This type of marking provides data about the product, such as, date of manufacture, shelf life, factory origin, model and/or serial number, product tracking and the like. The use of lasers to provide marking indicia is preferred since it does not generally affect the integrity of the article or product or its packaging and the marked indicia is not easily removable.

An example of traditional laser marking systems are cw or pulsed $CO_2$ lasers and yttrium aluminum garnet (YAG), e.g., Nd:YAG lasers where the marking is accomplished by the heat of the applied laser beam. The wavelengths of the pulses produced by these systems are within the visible or infrared spectrum. A pattern or indicia to be marked is formed by using a mask through which the laser beam passes or by a focused laser beam which is moved or scanned to produce the desired indicia or pattern. Such lasers are also employed for engraving, soldering and welding wherein, the case of marking, the surface layer of the material is melted, ablated or vaporized to produce discernible indicia or pattern. Also, this type of article marking may be accomplished by use of a chemical reaction at the article surface to be marked where certain coating agents on the surface of the article, which may be visibly transparent, but undergo a visible contrast change under the influence of a laser beam or laser pulses.

$CO_2$ lasers have been principally employed for marking plastic surfaces, such as IC packages. The laser beam from the laser is directed through a copper stencil to form the indicia on the plastic surface. However, due to the shrinkage of IC packages over the years, $CO_2$ lasers, in many cases, are no longer suitable since high quality indicia with good visibility is no longer satisfactory for this particular application. However, low cost, lower marking quality $CO_2$ systems employing low cost X-Y galvanometer devices are still employed for applications not requiring high quality marking.

YAG lasers are extensively employed today for IC package marking as well as many other marking applications. YAG lasers have shorter wavelengths of operation permitting the marking of indicia on harder surfaces, such as ceramic material. The beam in the YAG marking systems is steered or scanned in one, two or three dimensions by means of a pair of displaceable mirrors mounted for rotation to displace a laser beam in orthogonal directions to form a two-dimensional scan of the beam on the surface to be marked, such as, for example, a X-Y galvanometer device or a X-X galvanometer device operated under computer control. Examples of two-dimensional scanners are disclosed in U.S. Pat. Nos. 5,225,923; 5,329,090; 5,719,372; and 5,724,412. Indicia is scribed onto the surface of an article to be marked with fine resolution and marking clarity on comparatively, smaller surfaces, such as in the case of smaller IC packages. A specific example of a YAG laser system for this type of marking is the scanning Nd:YAG laser called the Laser Marker SL475E, manufactured by NEC Corporation of Japan. The marking parameters of this system are as follows: (1) Laser Oscillator: SL114K, (2) Laser Type: cw Nd:YAG laser, (3) Output: 50 W or above, (4) Number of Marked Characters: 40, (5) Marking Method: One stroke or vector, (6) Power at Marked Surface: 1 W, (7) Scanning Speed: 100 mm/sec., (8) Bite Size: 30 $\mu$m; and (9) Q-Switch Frequency: 3 kHz.

The disadvantage of these $CO_2$ and YAG laser marking systems is the need in most instances for separate, expensive refrigerated chillers or water cooling units and corresponding cooler controller and power supply to maintain cooling of the cw operated laser diode arrays for pumping the YAG rod or cw operated $CO_2$ marking lasers. The chillers are required in $CO_2$ marking lasers due to the low efficiency in converting lamp pump light into a cw laser output.

Further, the modulation of these marking lasers is generally accomplished by means of modulating their optical output beams, such as with an acusto-optic modulator, to produce appropriate pulses for forming marking strokes or vectors that, together, form intelligent indicia on the article surface. As a result, as much as 20% to 30% of the power in the modulated output is lost due to this type of external modulation. The cw operation of these types of lasers is a waste of energy, requires continual maintenance of the lasers, and reduces their overall lifetime utility. In the pulse mode, there is a large pulse-to-pulse variation in YAG marking lasers, as they lack uniformity in the energy applied to the marking surface. Moreover, the external modulator, beside its high loss, does not last long in the field and needs to be replaced, and is an added and continuing cost to the laser marking system, along with its RF driver. Further, the YAG laser systems used for marking require first pulse suppression, i.e., when the laser is turned off the light has to be "bled off". Also, these systems with their associated cooling units and large power supplies and large laser head takes up a consider amount of floor space in a manufacturing facility.

What is needed is a less expensive marking laser system that provides marking "power-on-demand", i.e., is not continually required to be continuously pumped for accomplishing the marking process, and taking up minimal floor space.

It is a principal object of this invention to provide a fiber laser system that provides indicia marking power-on-demand.

It is an object of this invention to provide a laser-pumped fiber laser marking system that is more compact and smaller in size than previous laser systems for marking surfaces to produce visible indicia on the surface.

It is another object of this invention to provide a laser marking system requiring no first pulse suppression.

It is another object of this invention to provide a first high power laser marking system employing a double clad fiber as the marking laser wherein its optical power output is modulated to form the marking indicia by modulation or switching ON and OFF of its pump laser, e.g., a semiconductor laser diode source.

It is a further object of this invention to provide a laser marking system that achieves high powers for surface marking accomplished with shallow surface depth significantly less than about 27 μm.

SUMMARY OF THE INVENTION

According to this invention, a laser marking system comprises a high power fiber laser consisting of a double clad fiber having a doped core surrounded by an inner pump cladding and providing an optical output for marking; a high power laser diode source for pumping the double clad fiber laser via an input into the inner pump cladding; an optical scanner coupled to receive the marking output from the double clad fiber laser to scan the output over a surface of an article to be marked by sweeping the marking output in one, two or three dimensions to form strokes or vectors, the completion of which comprises indicia to be marked the article surface; and a controller to control the operation of the scanner in synchronism with the modulation of the laser diode pump source to initiate the marking output and sweep and modulate the marking optical output in one, two or three dimensions to form strokes comprising the indicia. The system is capable of useful modulation rates from about 20 kHz for high contrast marking on a variety of different materials with peak pulse outputs, for example, of around 1 kW to about 5 kW, and up to cw operation especially adapted for marking thin, surface-mount packages. A main advantage of the fiber laser marking system over diode pumped and flash lamp pumped YAG laser marking systems is the ability to provide modulation via the semiconductor laser diode at the input to the marking laser rather than having to modulate the optical power beam at the output of the marking laser, such as through an acusto-optic modulator, which does not provide for a uniform pulse in terms of optical power across the pulse width and substantially decreases the amount of power in the modulated beam output. Also disclosed is circuitry to dampen or decrease the ON-time rise of a current signal input for operation of the laser diode pump source to improve the ON-time quality of the marking optical output created by the double clad fiber marking laser.

It is believed at this writing that the fiber marking laser system disclosed herein is the only continuous single mode fiber marking laser system commercially available in the market place.

In the laser marking system of this invention, the optical power provided for marking is power-on-demand, i.e., the diode pump lasers for the fiber marking laser are turn on and off as power is needed for forming marking strokes and vectors by means of sweeping the marking output during its ON-time period. Since the laser diode pump is not operating cw, the lifetime of the pump source is extended comparatively over the same period of time of usage.

Another advantage of the fiber laser marking system of this invention is that the modulated laser diode source can be modulated in a random ON-time period fashion with pulses produced from the fiber marking laser of any length, of any selected height at any time, i.e., when necessary on demand. In Q-switched YAG lasers, the pulsed output is limited by the Q-switch in that it can operate only with period pulse of approximately of the same pulse width.

A further advantage of the fiber laser of this invention over diode pumped YAG marking systems is that the laser diode pumping of the fiber laser occurs along the length of the fiber such as, for example, anywhere between about 20 meters to about 50 meters long, which is a length greater than one hundred times that of a YAG rod, which, may be, for example, 1 cm. to 3 cm. long. As a result, the heat generated in a laser diode pumped YAG is much greater and can readily cause thermal lensing in the YAG rod resulting in distortion of the YAG single mode operation either by laterally shifting the mode in the YAG rod or by operating in other models other than the fundamental mode. This shifting and multiple mode operation is caused by changes in refractive index of the YAG rod because of nonuniformity of heat developed along the length of the rod due to differences in the optical power along the rod length. This phenomena can result in pulse-to-pulse variations in pulse power and in mode quality if the pulse width length or the pulse height is varied from pulse to pulse in operation of the YAG marking laser. In the use of a single mode fiber marking laser of this invention, no mode distortion occurs since the mode core waveguide of the fiber, which is in the range, for example, of 3 μm to 6 μm in diameter, continually maintains single mode operation.

Another feature of the fiber marking laser system of this invention is its reliability to maintain the intensity level of optical marking output by means of its feedback for controlling the current level in operation of the laser diode pump source. Thus, if there is a detection in the intensity of the marking output, the feedback control provides for increase of the current to the driver circuit for the pump laser source to increase the marking output of the fiber marking laser to its original intensity level.

A further feature of the fiber marking laser system of this invention is a continuous single mode marking output that is flexible in that the output is directly coupled to the optical input of a scanner without need of initial alignment or subsequent realignment in the field as is true in the case of YAG laser marking systems wherein periodic realignment of the YAG marking laser optical cavity and output relative to scanner input is necessary.

The efficiency and effectiveness of the fiber laser marking system over YAG marking systems is substantial in that (1) the number of laser diode pump lasers is significantly less in number enhancing system reliability, (2) the optical conversion efficiency is significantly higher, (3) the power of operation is much lower, such in the range of only 2 volts to 5 volts DC, (4) no consumables are required for replacement such as laser diode pump sources or flash lamps which burn out comparatively faster in YAG systems due to their cw operation, and (5) improved reliability of the particular laser diodes used as pump sources due to their higher wavelength of operation, e.g., 915 nm for the pump sources used in the systems of this invention versus 810 nm employed in YAG pump systems.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a schematic block diagram of the laser marking system comprising this invention.

FIG. 2 is a specific embodiment of the invention shown in FIG. 1.

FIG. 3 is a cross-section of a double clad fiber which is preferred in the application of the invention to a laser marking system.

FIG. 4 is a diagrammatic view of a circuit for compensation of the ON-time of the current signal to the pump laser source of the laser marking system comprising this invention and its steady state control thereafter until signal extinction.

FIGS. 5A–5D are a series of ON-time rises for both the current driver signal, I(s), and the optical output signal, $P_0(s)$, for the circuit shown in FIG. 4. FIG. 5A is a case where the optical output signal, $P_0(s)$, is 8 W and the circuit of FIG. 4 is not employed. FIG. 5B is the case where the optical output signal, $P_0(s)$, is 8 W and the circuit of FIG. 4 is employed. FIG. 5C is the case where the optical output signal, $P_0(s)$, is 4 W and the circuit of FIG. 4 is employed. FIG. 5D is the case where the optical output signal, $P_0(s)$, is 2 W and the circuit of FIG. 4 is employed.

FIG. 6 is an actual graphic showing of a mark profile formed in an article surface using the fiber marking laser system of the present invention.

FIG. 7 is an actual graphic showing of a mark profile formed in an article surface using a Nd:YAG marking laser system known in the art.

DETAILED DESCRIPTION OF THE PREFERRED EMBODIMENTS OF THE INVENTION

Reference is now made to FIG. 1 showing laser marking system 10 employing a fiber laser 16 in combination with a pump source 12. Pump source 12 may be comprised of a single high power laser diode, a single laser diode bar, a plurality of laser diode arrays with their optical outputs combined, or a fiber laser source, for providing an output comprising a pump beam or light pulses 14 for input into fiber laser 16. Fiber laser 16 is a double clad fiber having a single mode core surrounded symmetrically by a multimode inner pump cladding surrounded by an outer cladding, such as shown in U.S. Pat. No. 3,808,549, or a double clad fiber of the type shown in U.S. Pat. No. 4,815,079 and having a rectangular inner pump cladding, both of which are incorporated herein by their reference. Also, the double clad fiber may be of the types disclosed in U.S. application, Ser. No. 09/050,386, filed Mar. 30, 1998, and assigned to the assignee herein, having a polygon shaped inner pump cladding, such as, for example, D-shaped or octagonal-shaped, or of the type shown in published European patent application No. 0776074, published May 28, 1997, having a star-shaped or irregular surfaced inner pump cladding. Both this U.S. and European applications are incorporated herein by their reference.

The output beam or pulses 18 from fiber laser 16 is coupled as an input into beam focusing and steering device 20. Device 20 focuses the marking beam 18 to a focal point at an image plane, which is at the surface of the object to be marked, while scanning the beam in two dimensions at the image plane. Such a device 20 is known in the art, examples of which are disclosed in U.S. Pat. Nos. 5,225,923; 5,719,372, and 5,734,412, which patents are incorporated herein by their reference. A computer 24, including its main controller (such as shown in U.S. Pat. No. 5,719,372, for example, except for control of a pump laser rather than a Q-switch) is connected via lines 26 to pump source 12 to control the ON/OFF operation of source 12 as well as the amplitude, frequency or pulse rate and ON-time of the supplied current signal to source 12, which will be described more detail later. Computer 24 is also connected by lines 28 to beam focusing and steering device 20 for controlling the two dimensional operation of the pair of X and Y galvanometer mirrors in the device to provide vector or strokes through the sweep of scanned beam 22, a series of such strokes producing intelligent marking, such as indicia, on the surface of the article to be marked. It should be noted that device 20 may also be a one-dimensional (X-X) or three dimensional (X-Y-Z) scanning device. The beam 22 from device 20 is deflected in two dimensions at an image plane on the article surface by the pair of galvanometer mirrors in a manner known in the art and explained in the three previously incorporated U.S. patents, such as illustrated in FIG. 1 of U.S. Pat. No. 5,734,412. Computer 24 may be a conventional PC and include a marking circuit and timing board and operating software that provides coordinate information, via the marking circuit, on lines 28, to adjust and scan the galvanometer mirrors to provide stroke paths for forming the indicia, such as characters or symbols, to be formed on the article surface. As an example, the letter "A" would comprise three strokes, the two angular side strokes of the letter and its cross bar stroke. The computer program provides coordinate information for each of these strokes so that, as the controller operates to provide current signals to pump source 12 to turn ON and OFF pump beam or pluses 14, device 20 will correspondingly sweep the laser marking beam 22, via the galvanometer mirrors, to form the three stroke comprising the letter "A". Between formation of each of the strokes forming the letter "A", the scanned laser beam or output 22 may be terminated or extinguished through termination of operation of pump source 20, during which time the galvanometer mirrors are positioned or repositioned to the coordinate point for the beginning of the next stroke for the letter "A" to be formed.

An important feature of laser marking system 10 is that it provides a laser marker that provides marking power-on-demand whereas prior laser marking systems employing YAG lasers require continuous operation with interruption of the marking beam by a modulator, for example, by Q-switching, as well as bleed circuitry to bleed off residual power in the laser cavity prior to initiation of the next stroke or mark. In addition, those employing $CO_2$ marking lasers require continuous operation with pulse width modulation. Also, these gas and solid-state laser devices generally require some kind of cooling such as refrigerated chillers and their power supplies, as necessary and additional equipment to maintain the $CO_2$ lasers or the YAG diode pump lasers sufficiently cooled for cw operation. System 10 eliminates the need for such additional equipment and its control through a high power fiber marking laser, producing 9 W to 20 W or more of power for marking an article surface, and the modulated output is accomplished by merely modulating the pump source 12 supplying power to fiber marking laser 16. Pump source 12 can be modulated for power-on-demand to form strokes or vectors comprising indicia for marking or can be operated cw. For example, fiber marking laser 16 can produce an output marking beam having a rise time of less than 1 millisecond and be turned off in less than about 0.5 millisecond upon turn off of pump source 12. Thus, the use of a modulator, such as an acusto-optic modulator in a Q-switched YAG laser system for providing a pulsed output, external of and within the axis of the optical output for marking, is not necessary or required. Such modulators are undesirable from the standpoint of stability of the produced output pulses and the reliability of the RF driver for the Q-switch, requiring frequent field service and provides added cost to the marking system. They also reduce the power of the resultant output marking beam or pulses by as much as 20% to 30%.

In operation, computer 24 provides a pattern of control pulses to pumping source 12 while directing beam steering device 20 to move in two dimensions the marking beam energy across the article surface to be marked. The square or rectilinear pulses provided to pump source 12 provide an output 14 that causes marking laser 16 to reach threshold and produce a series of light pulses fairly proportional to the amplitude of the electrical pulses, but delayed by several hundred microseconds due to the time response of the fiber laser. The pulse width and pulse frequency or repetition rate produced by the pump source 12 may be varied to modify the duty cycle of the marking laser 16 and the amount of marking energy applied in scanned beam 22 to the article surface. The amplitude level of the pulses to pump source 12 may be set to provide an output light pulse from marking laser 16 that is one percent up to 100% of the duty cycle without applying too excessive of a power level that may burn or otherwise cause different contrast levels in forming indicia strokes or vectors.

Also, another advantage of the fiber laser marking system 10 is that there is no requirement to discharge any residual energy prior to commencement of the marking process and the rendering of the first stroke or vector. The initial pump pulse or an initially higher intensity beam 14 in system 10 may be provided with additional energy or amplitude to bring about a quicker rise in population inversion in fiber laser 16 so that no gaps or missing stroke portions occur upon marking of the initial indicia stroke. Alternatively, a dummy mark may be provided at the initiation of the marking process to compensate for the failure of a portion of the first stroke to be printed should the marking beam sweep commence just prior to the commencement of the output of marking beam. This failure of marking the full extent of the first stroke may be due to principally to a variance in or longer delay between the application of ON-time of the pump laser 12 and the output from the marking laser 16, which delay is different, and longer, if the marking system 10 has been idle for a period of time, such as a second or more, compared to continuous operation cw or at a pulse rate with pulse spacings of a few 100 μsec. In the latter case, there is some residual population inversion in fiber marking laser so that the energy level to achieve marking output 18 is sooner than in the case where all the energy in the fiber has dissipated with the system being idle for some period of time. Thus, the controller of system 10 may provide a dummy pulse after a predetermined period of time after the system has been idle to form the first marking stroke of indicia comprising the combination of the dummy mark pulse together with the completion of the pulse for the first indicia stroke.

Reference is now made to FIG. 2 which illustrates a more detailed embodiment of this invention. Laser marking system 30 comprises semiconductor laser source 32 which may be comprised of a laser diode array, such as SDL Model No. 6460-P6, manufactured by SDL, Inc. of San Jose, Calif., providing a light output of about 17 watts. For higher light output, several semiconductor laser bars having multiple light emitters may be combined, such as employing a turning mirror, to produce a single output comprising as much as 28 W or more of pump output power, such as illustrated in U.S. Pat. Nos. 5,168,401 and 5,268,978, both of which are incorporated herein by their reference. These types of devices may require some cooling to maintain a constant environmental temperature, such as employing a thermal electric cooler as is known in the art. These coolers are extremely small when compared to chillers used with gas or solid-stated marking sources, and are provided as part of the laser source package.

The optical output beam 37 from laser source 32 is collimated and then focused by the respective spherical type lenses of lens set 34 for directing beam 37 into the input end of double clad fiber 36, in particular, into the inner pump cladding 36B of the fiber. Double clad fiber 36 includes a core 36A, doped with a rare earth material as is well known in the art, such as Yb. Core 36A may be comprised of a glass and have a diameter of about 3 or μm whereas inner pump cladding 36B may have a diameter of about 100 μm or 200 μm, for example. Inner pump cladding 36B is of a material, such as glass, that is of a lower refractive index than core 36A. Inner cladding 36C is surrounded by an outer cladding 36C that has a lower refractive index than inner cladding 36B to contain the pump light 37 within cladding 36B. As is well known in the art, pump light is reflected back and forth at the interface between claddings 36B and 36C as the pump light propagates down the full length of the fiber so that, as the reflecting light criss-crosses the rare earth core 36A, it is absorbed in the core. An example of the cross-section of fiber 36 is illustrated in FIG. 3 and is disclosed in U.S. patent application, Ser. No. 09/050,386, supra.

In order to form a lasing cavity, a mirror 36M is provided at the input end of fiber 36 which is coated to be transparent to pump light 37 but is highly reflective at the lasing wavelength of fiber 36. The output end 36F of fiber 36 is highly polished so as to form a partially internal reflecting surface, for example, having a reflectivity of about 4%, at the lasing wavelength. Thus, polished facet 36F and mirror 36M form the lasing cavity for double clad fiber marking laser 36. The output beam from marking laser 36 is collimated by lens 41 for passage as shown at 44 into an input aperture in two dimensional scanner 40. Collet 39 is fit onto the output end of marking laser 36 to which is secured lens frame 38 for supporting lens 41. A small portion of the marking output 44 is split off via beam splitter 46 to provide optical feedback to a closed-loop control for controlling the power to diode laser pump source 32 to maintain the marking output 44 at a predetermined intensity level, whether pump source 32 is operated cw or pulsed. More will be said about this control later.

It should be noted that, for purposes of clarity, lens frame 38 and beam splitter are shown in FIG. 2 in diagrammatic form. However, in fact, these components, as secured to the end of fiber 36, are all housed in a single tubular housing, and form an end housing at the end of a portion of the flexible length of fiber comprising fiber marking laser 36. Thus, the forward end of this tubular housing is easily mounted on an input aperture 40A of scanner 40 and, as such, continually remains in proper optical alignment with the scanner input. No later field adjustments are necessary to this attachment as is true in the case of YAG marking laser systems where it is necessary to realign the pulsed output with proper optical axial alignment to the scanning mirrors of scanner 40.

As a specific example of the operating wavelengths of system 30, semiconductor laser source 32 operates with an emission wavelength within the range of about 900 nm to 930 nm, for example, 915 nm, which is within the absorption band of Yb. Fiber marking laser 36 will operate at a wavelength such as 1100 nm to 1110 nm. The length of fiber for laser 36 is made sufficiently long to provide good depletion of the pump light along the length of the fiber. With the employment of a pump laser, such as SDL Model No. 6460-P6, comprising a laser diode bar with multiple light emitters with a 17 W output, power levels of 9 W can be achieved from high power double clad fiber laser 36. If a plurality of stacked laser bars are employed, their combined output as a source 32 would be about 15 W. In an already reported configuration, a 13.5 W laser diode pump source 32 operating at a wavelength of 807 nm, produced 5 W of CW single transverse mode output power at 1064 nm from a 45 to 50 meter long double clad, Yb doped fiber. The slope efficiency was 51%, although the overall optical conversion efficiency was only 40% due to losses at the optical interface between source 32 and fiber 36. These conversion efficiencies have, however, been improved to 60%. The beam in system 30 can be focused to a spot size as small as 1 μm, but diameters of about 15 μm or more are adequate for most marking applications, with corresponding brightness of 109 W/cm$^2$ sterdain due to the diffraction limited quality of output beam 44 from output facet 36F of double clad fiber marking laser 36.

It should be noted that, instead of using the lens set 34, the output from a diode laser bar may be fiber coupled to double clad fiber 36 where the coupling fibers from the individual emitters are brought together to form a bundle which matches the input aperture or NA of the inner cladding 36B of double clad fiber 36, such as in a manner similar to that illustrated in U.S. Pat. No. 5,268,978, which is incorporated herein by its reference. Also, the source fibers may also be fused together at their output ends and the molten end pulled in its molten state and cut at a point to match the NA of the input end of the inner cladding 36B of double clad fiber 36.

Also, it should be noted that if the high power operation of marking laser 36 causes SRS or high Raman gain, robbing the laser of its peak output at 1110 nm into other output wavelengths, fiber grating filters may be employed in the laser cavity to filter out the SRS, or fiber 36 may be bent about a core at an appropriate bend angle to permit the ejection of Raman wavelengths. Also, co-doping of core 36A, such as Er:Yb, may also provide relief from Raman scattering.

The employment of a double clad fiber as the laser marking source 36, versus a YAG laser or single mode fiber, as several advantages. First, a single mode pump source at 32 is not required because the numerical aperture (NA) of the inner pump cladding 36B is quite large in view of its diameter so that multimodes propagate along the pump cavity. Tight control over the pump source wavelength is not required and is unnecessary because of the large spectral absorption bandwidth of the rare earth doped fiber 36, e.g., the absorption spectrum for Yb.

Second, the double clad fiber is essentially pumped along its entire length due to the cladding cavity so that more power can be absorbed into the fiber core over a fiber sufficient to absorb almost of the pump light, rendering a much higher power gain medium compared to that possible with a single mode fiber. Also, in a YAG system, the pumping length along the YAG rod is materially less so that there is a much larger thermal load that causes changes or shifts in the refractive index of the YAG rod leading to mode distortion and pulse outputs characterized by optical non-uniformity in pulse-to-pulse power. Also, the use of double clad fiber as a laser marking power source increases the overall optical conversion efficiency to 60% or more which is higher than conventional single mode (TEM$_{00}$) laser marking systems employing $CO_2$ and YAG lasers.

Third, if a fiber of the type taught in U.S. patent application, Ser. No. 09/050,386, supra, as illustrated in FIG. 3, is employed, a greater amount pump power can be absorbed in a comparatively shorter length of double clad fiber. This type of polygon inner pump cladding configuration is a preferred embodiment for the double clad fiber in this particular marking application since the cladding configuration 80 in FIG. 3 induces the propagating pump light to reflect along the interfaces at many more different angles and criss-cross core 36A more often, greatly enhancing the amount of pump light absorption in core 36A with a shorter length of double clad fiber. However, other polygon configurations will also work as well. The configuration of FIG. 3 is, however, easier to manufacture than other polygon configurations suggested in the art for the inner pump cladding.

Fourth, the large NA of the inner pump cladding 36B permits a better match of the aspect ratio of the pump laser source 32 with the input end of inner pump cladding 36B resulting in a more efficient coupling between the pump laser source and the fiber.

Fifth, system 30 pumped by a single laser bar, or other high power laser source capable of delivery power outputs of 15 W to 30 W and more, reduces system complexity while improving lifetime utility over $CO_2$ and YAG laser systems, and does not require a bulky power supply, a refrigerated chiller and separate laser head as used in single mode (TEM$_{00}$) laser marking sources employing $CO_2$ or YAG lasers.

Referring again to FIG. 2, two dimensional scanner 40 is a device available in the marketplace, and in the embodiment here is the Model No. HPM10A optical scan head available from General Scanning, Inc. of Watertown, Mass. The laser marking output beam 44 is received at an input aperture of scanner 40 and, through the use of a pair of fast-recovery galvanometer mirrors, one each for the X and Y axes, the marking output can be scanned in two dimensions. The focused output beam 42 from scanner 40 can be scanned in two dimensions and focused to a spot 66 at the image plane which is the surface 62 of an article 60 to be marked. Article 60 may be positioned on a conveyor system 63 which moves a series of articles 60 which are, one at a time, positioned beneath scanned beam 42 for marking indicia 64 as is known in the art. The working field of scanner 40 at the image plane may be a square or rectangular that may be varied in size on a side from about 60 nm to about 180 nm depending on the chosen flat-field lens employed at the output of scanner 40. In FIG. 2, focused and scanned beam 42 is shown in the process of completing the second stroke 65 of the letter "D", having already completed its first stroke 64.

The power output of laser beam 42 is in the range of 5 W to 20 W or more and is capable of vaporizing a thin surface layer off of top surface 62 of article 60. Article 60, may for example, be an encapsulated integrated circuit chip comprising a plastic resin material with a filler, such as carbon or the like. Scanned beam 42 will vaporize a thin surface layer from the resin package which leaves an exposed undersurface that is of a visibly different reflected contrast than original surface 62 so that the indicia is discernible to the naked eye and provides for a permanent mark that cannot be easily removed and will not smudge. No additional printing medium or ink is necessary in the process. More importantly, large, deep removal of material from the package is not necessary or desirable. High power $CO_2$ or YAG laser marking systems often remove material from the article surface forming holes and grooves as deep as 50 μm to 100 μm in the article surface to form the indicia marking. In system 30, the holes or grooves forming the strokes of the indicia 65 are in the range of about 6 μm to 27 μm, the higher end of this range being only in cases where the indicia strokes touch or cross one another. The debris formed from the larger hole or groove formation with high power $CO_2$ or YAG laser marking systems is significant, requiring vacuum cleanup at the marking site. However, the marking beam in system 30 vaporizes a significant smaller amount of material from the surface sufficient to achieve a reflected contrast to form visible discernible indicia on the article surface. Thus, such excessive vacuum cleaning is not a major requirement in the fiber laser marking system of this invention.

While the foregoing example relates to an integrated circuit chip application, laser marking system 30 may be employed for marking other materials, such as metals, ceramics, wood, glass, and other plastics and is, therefore, not limited to this above described application.

With further reference to FIG. 2, controller 50 for laser marking system 30 comprises a personal computer 51 that includes conventional circuitry that provide digital signal control to scanner 40 via lines 59. Control functions are standard and known to those skilled in the art for the scanning system and accessible through the computer RS-232 interface using software provided by the scanner manufacturer called PC-MARK™ or PC-MARK MT™ and JOB EDITOR™ as well as machine and user interface software called RJE™, WINLASE™ and WINIC™, available from SDL, Inc. of San Jose, Calif.

An important feature of this invention is the closed-loop feedback circuit to control the current of lasers source 32, particularly when system 30 is operating in the pulse mode or is operating with power-on-demand by switching on laser pump source 32 to form marking output 44 which is scanned or swept to form the strokes for forming the indicia. System 30 provides a stable level of marking energy regardless of the pulse rate or frequency and duty cycle resulting in a continuous marking contrast level on the article surface. This is an important factor and achievement in a laser marking system that is characterized by a fiber marking laser that is modulated through its optical pumping source by modulating the pumping source rather than modulating the output beam of the marking laser such as with an acousto-optic modulator. In FIG. 2, the intensity of marking output 44 is controlled for this purpose, via light and signal feedback, to control the current supplied to operate laser source 32. Controller 50 includes control circuitry 52 for receiving a feedback signal on line 58 from photodetector 48. Photodetector 48 receives a small portion of marking output 44 via beam splitter 46 which is proportional to the output intensity of output 44. Photodetector 48 provides an electrical signal via line 58 to control circuitry 52 which provides a drive current signal to laser source 32 proportional to the intensity of output 44. As well be explained in greater detail later, the level of the drive signal is determined by comparing the feedback signal from photodetector 48 with a reference.

While this type of control works well when there is an output 44 present from marking laser 36, this is not always the case unless system 30 is operated CW. One of the advantages of system 30 is to operate it in a pulse mode so that marking power is only provided on demand, i.e., when an indicia stroke is to be formed. However, in the cases where power-on-demand is employed, that is, in one of the two situations where either the laser pump source is operated in pulse mode to form a stroke or vector as a series of marks, or the laser is turn ON and OFF, respectively, at the beginning and at the end of each indicia stroke or vector. In either of these situations, there is no output 44 present at the beginning of each pulse or energy signal provided to the drive circuit for setting the laser pump source 32 into operation. Therefore, there can be no optical feedback for monitoring and controlling output 44 via control circuitry 52 at this point in time. Thus, in order to form an enhanced, quicker ON-time of the output 44, the pulse control circuitry 90 shown in FIG. 4 is utilized. Pulse control circuit 90 also provides less delay between operation of laser pump source 32 and marking laser 36 and provides an ON-time which is of a steeper ramp-up to its full intensity. One purpose of circuit 90 is to provide, as much as possible, an instantaneous turn-on time for fiber marking laser as soon as an turn-on signal is sent to the laser pump source 32, i.e., produce a more square pulse ON-time in creating marking output 44. Another important purpose of circuit 90 is to dampen the overshoot present in the beginning of the rise-time of each turn-on time in the output 44 of fiber marking laser 36. As used throughout this specification, "ON-time", means the rise characteristic of current to a maximum level as provided to the laser pump source and the rise characteristic to the sustained intensity level of the marking output 44 produced by the fiber marking laser 36. "ON-time period" means the time that the fiber marking laser 36 or the laser pump source is producing an output for marking.

With reference to FIG. 4, pulse control circuitry 90 shows semiconductor laser pump source 92 provided with a current signal, I(s), input from line 104 provided by current driver circuit 102. The optical output from laser pump source 92 is provided as input to double clad fiber marking laser 94 which has a delay time or population inversion function 93 and provides stimulated lasing operation 95 to produce an optical power marking output, $P_0(s)$, at 96. As previously indicated, a portion of marking output 96 is provided as feedback for control of the intensity of this output, no matter the frequency or duty cycle of the light output. Signal conversion from optical to electrical signal and amplification is accomplished at circuit 98 and this electrical feedback signal on line 99 is provided as an input to comparator 100 for comparison with a reference signal, R(s), at 101. The circuitry thus far described provides means for monitoring the output intensity of marking laser 94 and providing a signal from comparator 100 to drive circuit 102 for producing an appropriate drive current signal, I(s), to maintain the steady-state intensity during the duration of optical output, $P_0(s)$. However, as previously indicated, there is no initial output at 96, due to the delay 93, to make an initial deter-mination of the amount of current to start with for the ON-time of laser pump source 92. As a result, the powering of laser pump source 92 will cause an overshoot in the optical output at 96 at the commencement of the optical power output ON-time from marking laser 94. Also, in reference to the delay between the ON-time of source 92 and the optical power output from marking laser 94, it is desirable to make this delay as small as possible as well as provide a rise-time of the ON-time for pump source 92 which would translate optically to a correspondingly steep rise-time of the commencement of the optical power output ON-time from marking laser 94. Further, the rise time of output 44 is not square. However, the overdrive circuit 105 of circuit 90 provides a way for improving each of these points.

Overdrive circuit 105 comprises compensation circuit 106 and nonlinear function device 108 to provide a small over-drive of the ON-time of current signal, I(s), i.e., during the rise time of signal I(s). Circuit 106 is a circuit that responds to the fast rise time of signal I(s) within a predetermined period of time, such as in the range of about 50 μsec. to about 80 μsec., and produces an output signal to nonlinear function device 108. Device 108 may be comprised of a pair of oppositely coupled bipolar diodes having a forward and reverse bias threshold with a threshold gap region therebetween where no current is allowed to flow as a signal output onto feedback line 99. Thus, overdrive circuit 105 allows, in part, for current driver circuit 102 to commence with its ON-time signal, I(s), at the fastest rate before optical output 96 has commenced and before the end of the current signal rise-time, based on current signal, I(s), via line 104, provides an electrical signal to device 108 that is above its threshold that produces a dissipating pulse on feedback line 99 during this period of time to comparator 100. Comparator 100 will begin to dampen the rise rate of the current signal I(s) prior to its reaching its peak value due to dampening signal 109. By the time dampening signal 109 has dissipated, the peak optical output at 96 from fiber laser 94 has been sensed, via circuit 98, and the feedback signal via line 99 from circuit 98 takes over the function of feedback to comparator 100.

FIGS. 5A–5D show a series of pulse diagrams wherein curves 110A–110D are current signal, I(s), at respective peak values of approximately 20 A, 20 A, 10 A and 5 A, and curves 112A–112D are optical output signals, $P_0(s)$, with corresponding output powers 8 W, 8 W, 4 W and 2 W. FIG. 5A is the case where there is no overdrive circuit 105 and FIGS. 5B–5D are cases where there is an overdrive circuit 105 at respective optical output powers of 8 W, 4 W and 2 W. It should be noted that a characteristic of the optical output signal, $P_0(s)$, is believed due to nonlinearities and other nonuniformities of the double clad fiber causing the resonance or ripple 114A–114D at the top of the optical signal rise during ON-time, which resonance dampens over a short period of time to a steady state peak power condition. The time interval of this resonance may be as small as 100 $\mu$sec. and is generally less than 500 $\mu$sec. This resonance 114A–114D has been found to have no substantial effect on the performance of the marking process, particularly since the ripple time period is less than the inertia time to move and position the galvanometer mirrors in scanner 40.

To be noted is the difference in the ON-time of signals I(s) and P0(s) in FIG. 5A at 8 W compared to these same signals in FIG. 5B at 8 W. The differences are three-fold, as indicated previously. First, the rise-time of the current signal in FIG. 5A is longer in time than in FIG. 5B. Second, the delay 115A between the rise time of current signal 110A and optical output signal 112A in FIG. 5A is longer than the delay 115B in FIG. 5B. Third, the rise of the optical output signal 112A at 116A is at a more angular slope than the rise of optical output signal 112B at 116B. The rise 116B of signal 112B is close to a straight vertical time rise. The same is true for the cases of FIGS. 5C and 5D. Overdrive circuit 105 controls the average of large overshoot 113, shown in FIG. 5A, of the initial signal resonance 114A so as to be approximately within 10% of the signal amplitude or lower by operation of comparator 100 to dampen the current driver signal I(s) prior to the circuitry operating under the influence of feedback from marking output 96. In this case of FIG. 5A, the average overshoot can be a factor of 1% peak and, then, signal 112A settles down to a steady-state value of about 8 W. As can be seen from FIGS. 5B–5D, the initial peak resonance is significantly less than that in FIG. 5A, indicating a dependence on the magnitude of current signal, I(s).

Overdrive circuit 105 works in the following manner. If the controller, such as controller 50 in FIG. 2, provides an activation signal for commencing the marking process, the control circuitry 52 will cause drive circuit 102 to provide a current signal, I(s), to activate laser pump source 92. Since there is no optical output signal, $P_0(s)$, present, the rise of current signal, I(s), initially occurs rapidly in time until a point is reached, i.e., via input of this signal to overdrive circuit 105 of sufficient magnitude to cause device circuit 108 to reach its threshold and conduct providing a signal on feedback line 99 to comparator. This occurs before the beginning of the ON-time of optical marking output 96, as seen, for example, in FIG. 5B. In FIG. 5B, it can be seen that the current signal rise at 118B is now not as steep in rise-time. Over the remainder of the rise time of current signal, I(s), overdrive circuit continues to provide a dampened signal via comparator 100 until the ON-time of optical output signal 112B is complete and the optical feedback is employed via comparator 100 to control the steady-state condition of the signal output. Stated another way, comparator 100 commences comparative analysis much earlier in the rise time of the current signal, I(s), and prior to any available feedback from optical marking output 96.

An important attribute of the fiber marking laser of this invention is significantly reduced noise in the optical output from the fiber laser compared to that of YAG laser marking systems. The marking output is more uniform along the length of the marking stroke or vector compared to that from the YAG laser. The pulse-to-pulse noise on Q-switching in a YAG laser system is much nosier. This is illustrated in the actual marking profiles shown in FIGS. 6 and 7 respectively for a stroke formed by marking laser system 30 of this invention and that of a Nd:YAG system. The cross sectional profiles of the resultant marking is shown in these figures in both cases for the same article comprising a plastic article surface. As shown in FIG. 6, the mark depth produced by the fiber marking laser is significantly more uniform over the width of the mark depth and is much less in overall depth than that for the YAG marking laser. Notably, the average marking depth width of the fiber laser is less than 8 $\mu$m with a peak value only about one-half time greater than the average marking depth, whereas the average marking depth width of the YAG marking laser is above 10 $\mu$m with peak values two to three times greater than the average marking depth appearing at the beginning and at end of the mark depth profile. As a result, the marking profile of the YAG marking laser is not as precise as that obtained with the fiber marking laser of this invention, providing for overall improved marking visibility to the observer over that produced by the YAG marking system because of the improvement in marking profile uniformity.

It is noted that in the operation of the laser marking system of this invention, when the system has been idle since the last mark command by a second in time or more, there is a tendency for the initiation of the first mark command from the controller not to provide an optical marking output 96 sufficient to produce the full length of the first stroke to be marked. Thereafter, with continuous sweep of the marking beam by the scanner and modulation of pump laser 92, the marking strokes for forming the indicia are substantially all of the properly proscribed length. Correction of the short-in-length first stroke in such a case can be compensated for by providing a first dummy pulse that is provide by the controller to the driver circuit prior to initiation of the first marking command. This dummy pulse together with the completion of the first marking stroke command to provide a current pulse to pump laser 92 will provide an optical marking output 96 from fiber laser 94 sufficient to form a full and complete marking length of the initial stroke for an indicia to printed on the article surface. Also, it is within the scope of this invention to also provide in these cases where the laser marking system 90 has remained idle for a period of time, such as a second or more, to initially provide a preconditioning pulse to laser diode source 92 prior to initiation of the first mark command, via current driver circuit 102 under the control of the system controller, for printing the first stroke of an indicia to be marked. This preconditioning pulse is a short pulse sufficient to cause laser pump source 92 to produce a high intensity light pulse of short duration to double clad fiber laser in order to provide for some initial population inversion in the fiber a few microseconds prior to the initiation of the first mark command or in a time period before the residual energy in the fiber due to the preconditioning pulse has had an opportunity to dissipate. While the energy in fiber 94 may provide some light output in the form of ASE or even a low energy level light pulse, the energy is not sufficient to produce a mark on the article surface. However, the presence of the residual energy in the fiber provides a "head start" for the initial marking stroke to be initiated in time to complete the full length of the initial marking stroke to be produced.

Although the invention has been described in conjunction with one or more preferred embodiments, it will be apparent to those skilled in the art that other alternatives, variations and modifications will be apparent in light of the foregoing description as being within the spirit and scope of the invention. Thus, the invention described herein is intended to embrace all such alternatives, variations and modifications that may fall within the spirit and scope of the following claims.

What is claimed is:

1. A laser marking system comprising:
   a high power fiber marking laser consisting of a double clad fiber having a doped core surrounded by an inner pump cladding and providing an optical output for marking;
   a high power semiconductor laser source for pumping said double clad fiber laser, a light output from said semiconductor laser source optically coupled as an input to said inner pump cladding;
   an optical scanner coupled to receive an output beam from said fiber marking laser and scan said output beam over a surface of an article to be marked;
   a controller to provide for direct modulation of the semiconductor laser source light output at a modulated rate and pulse width to correspondingly provide a modulated rate and pulse width for said marking laser optical output; and
   means to control operation of said scanner in synchronism with modulation of said laser pump source to initiate said marking output and modulate said marking output from said fiber marking laser in multiple dimensions to form strokes comprising discernible indicia on the article surface.

2. The laser marking system of claim 1 further comprising said optical scanner sweeping said fiber marking laser output in multiple dimensions to form strokes comprising discernible indicia formed on the article surface.

3. The laser marking system of claim 1 further comprising means to control the operation of said scanner in synchronism with the modulation of said laser pump source to initiate said marking output and sweep and modulate said marking optical output in multiple dimensions to form strokes comprising the discernible indicia.

4. The laser marking system of claim 1 wherein said double clad fiber has a non-circular geometry for its inner pump cladding.

5. The laser marking system of claim 4 wherein said double clad fiber has an inner pump cladding with a cross-sectional configuration that is shaped like a polygon.

6. The laser marking system of claim 5 wherein said polygon like shape is an octagon.

7. The laser marking system of claim 1 wherein said laser pump source comprises a fiber laser pumped by said semiconductor laser.

8. The laser marking system of claim 7 wherein said semiconductor laser is at least one laser diode array having a plurality of light emitters; and means to combine light outputs provided from said light emitters for input into said double clad fiber.

9. The laser marking system of claim 1 wherein said fiber marking laser provides for flexibility in aligning said output beam in maintained relation with an optical input to said scanner requiring no further readjustment.

10. The laser marking system of claim 1 wherein said fiber marking laser is turned off in less than about 0.5 milliseconds upon turn-off of said pumping laser source.

11. The marking system of claim 10 wherein said pumping laser source comprises a laser diode source or a laser diode pumped fiber laser source.

12. The marking system of claim 11 wherein said laser diode source comprises at least one laser diode bar.

13. The marking system of claim 1 wherein said pumping laser source comprises a laser diode source or a laser diode pumped fiber laser source.

14. The marking system of claim 13 wherein said laser diode source comprises at least one laser diode bar.

15. The marking system of claim 13 wherein said laser pumping source is operated in a power-on-demand mode so that said laser pumping source is turned-on or modulated at anytime that a marking sequence is to be initiated providing a marking output of a selected length and pulse height.

16. The laser marking system of claim 1 further comprising:
    a rigid support housing secured to the output end of said fiber laser, said housing including a lens system for handling said marking beam output;
    said optical scanner having an input aperture to receive said marking optical output;
    said fiber marking laser providing flexibility for the coupling of said housing to said optical scanner input aperture to permit said marking optical output to be properly aligned for beam scanning via said optical scanner.

17. The marking system of claim 16 wherein said fiber marking laser is a single mode fiber laser.

18. The marking system of claim 16 wherein two-dimensional scanning is provided such that said fiber marking optical output is moved for scanning in first direction and the optical scanner provides for scanning in second direction.

19. The marking system of claim 16 wherein two-dimensional scanning is provided such that said optical scanner comprises movement in two dimensions of the fiber marking optical output end for scanning a surface to be marked.

20. The laser marking system of claim 1 further composing means to dampen ON-time rise of a current signal input for operation of said laser pump source to improve ON-time quality of said marking optical output.

21. A laser marking system comprising:
    a high power fiber marking laser consisting of a double clad fiber having a doped core surrounded by an inner pump cladding and providing an optical output for marking;
    a high power semiconductor laser source for pumping said double clad fiber laser, a light output from said semiconductor laser source optically coupled as an input to said inner pump cladding;

an optical scanner coupled to receive an output beam from said fiber marking laser and scan said output beam over a surface of an article to be marked;

a controller to provide for direct modulation of the semiconductor laser source light output at a modulated rate and pulse width to correspondingly provide a modulated rate and pulse width for said marking laser optical output; and means to dampen ON-time rise of a current signal input for operation of said laser pump source to improve ON-time quality of said marking optical output.

22. The laser marking system of claim 21 further comprising means to control operation of said scanner in synchronism with modulation of said laser pump source to initiate said marking output and modulate said marking output in multiple dimensions to form strokes comprising discernible indicia on the article surface.

23. A marking system comprising:

a fiber laser as a light source system for producing an output marking beam having a fast rise time less than 1 millisecond;

a pump laser source for optically pumping said fiber laser; and pump laser circuitry to cause said pump laser to produce an additional optical output enhancement in the optical pumping of said fiber laser to minimize fiber laser turn-on delay so that an external modulator operative to modulate the output marking beam is not required.

24. The marking system of claim 23 wherein said additional optical output enhancement comprises a larger optical amplitude on fiber laser turn-on or an additional optical dummy pulse prior to fiber laser turn-on.

25. A fiber laser based marking system comprising:

an optical fiber having a rare earth doped core and pumped by a laser diode source and functioning as a fiber laser;

means for modulating said laser diode source to modulate its light output and coupling its modulated light into said optical fiber;

the modulated light being absorbed along its fiber length in the fiber core and providing a laser marking output;

an optical scanner coupled to receive said laser marking output for scanning the output in two dimensions; and a computer to control in combination said scanner and modulation of said laser diode source so that the marking output of said fiber laser is scanned in timed relation with the modulation of said laser diode source to form a plurality of sequenced marking strokes that are patterned in two dimensions on a surface of an article to be marked to form discernible indicia thereon.

26. The fiber laser based marking system of claim 25 wherein said fiber laser is a single mode laser.

27. The fiber laser based marking system of claim 26 wherein said fiber laser comprises a double clad fiber.

28. The fiber laser based marking system of claim 25 further comprising:

means to generate marking strokes in predetermined spatial relation to one another to form intelligent indicia on the article surface; and means to control an excitation level and timing of operation of said laser diode source such that said strokes occur in said predetermined spatial relation at a determined level of marking output power to produce a desired marking contrast and marking depth in the article surface being marked.

29. A laser marking system comprising:

a high power fiber marking laser comprising a fiber having a doped single mode core and providing an optical output for marking;

an optical scanner coupled to receive the optical output from the fiber marking laser to scan the optical output over a surface of an article to be marked;

a laser diode source providing a modulated optical output coupled for pumping said fiber laser;

a drive circuit for providing an electrical signal for controlling changes to a current level of the signal applied to said laser diode source and, correspondingly, changes in an optical output intensity level in the optical output provided from said fiber marking laser;

means to control the operation of the scanner in synchronism with the modulation of the laser diode source to initiate the optical output and modulate the optical output in multiple dimensions to form strokes comprising discernible indicia;

means for detecting the optical output intensity level from said fiber marking laser; and feedback means for comparing the detected optical output intensity level with a desired level and adjusting the current level to maintain the optical output intensity level at said desired level.

30. A laser marking system comprising:

a high power fiber marking laser comprising a fiber having a doped single mode core and providing an optical output for marking;

a laser diode source providing an optical output coupled for pumping said fiber laser;

a drive circuit for providing an electrical signal for controlling changes to a current level of the signal applied to said laser diode source and, correspondingly, changes in an optical output intensity level in the optical output provided from said fiber marking laser;

means for detecting the optical output intensity level from said fiber marking laser; and feedback means for comparing the detected optical output intensity level with a desired level and adjusting the current level to maintain the optical output intensity level at said desired level and an overdrive circuit in said feedback means to provide an initial dampening in applying said electrical signal to said laser diode source.

31. The laser marking system of claim 30 wherein said initial dampening causes the rise time of said electrical signal be reduced in magnitude as said electrical signal nears its peak value.

32. A laser marking system comprising:

a fiber marking laser comprising a double clad fiber having a doped core surrounded by an inner pump cladding and providing an optical output for marking;

a laser source for pumping the double clad fiber laser, an output from the laser source optically coupled as an input to the inner pump cladding;

an optical scanner coupled to receive the output beam from the fiber marking laser to scan the output beam over a surface of an article to be marked;

means to modulate the laser source to provide a modulated marking optical output from the fiber laser; and means to control the scanner in synchronism with the modulation of the laser pump source to initiate the marking optical output and modulate the marking optical output in multiple dimensions to form strokes comprising discernible indicia.

33. The laser marking system of claim 32 wherein the inner pump cladding of the double clad fiber has a non-circular geometry.

34. The laser marking system of claim 33 wherein the non-circular geometry is a polygon shape.

35. The laser marking system of claim 32 wherein the control means comprises means to dampen ON-time rise of a current signal input for operation of the laser pump source to improve ON-time quality of the marking optical output.

36. The laser marking system of claim 32 wherein the laser pump source comprises a semiconductor laser source or a fiber laser pumped by a semiconductor laser source.

37. The laser marking system of claim 36 wherein the semiconductor laser source comprises at least one laser diode array having a plurality of light emitters with respective light outputs, and means to combine the light outputs for input into the double clad fiber.

38. The laser marking system of claim 36 wherein the semiconductor laser source is operated in a power-on-demand mode in that the semiconductor laser source is turned-on or modulated at anytime that a marking sequence is to be initiated providing a marking output that may be of any selected length and pulse height.

39. The laser marking system of claim 36 further comprising means to control an excitation level of the semiconductor laser source such that marking strokes occur in a predetermined spatial relation at a determined level of marking output power to produce a desired marking contrast at a marking depth in the article surface.

40. The laser marking system of claim 32 wherein the fiber marking laser provides for flexibility in aligning its output beam in maintained relation with an optical input to the scanner requiring no further readjustment.

41. The laser marking system of claim 32 further comprising:
a drive circuit for providing an electrical signal for controlling the laser source and changes in a current level provided to the laser source and, correspondingly, change in an optical output intensity provided from the fiber marking laser;
means for detecting the optical output intensity level from the fiber marking laser; and
feedback means to compare the detected optical output intensity level with a desired level and adjusting the current level to maintain the optical output intensity level at the desired level.

42. The laser marking system of claim 41 further comprising an overdrive circuit in said feedback means to provide initial dampening in applying of the electrical signal to the laser source.

43. The laser marking system of claim 42 wherein the initial dampening causes a rise time of the electrical signal to be reduced in magnitude as the electrical signal nears its peak value.

44. The laser marking system of claim 41 comprising a controller for providing marking signals to the driver circuit representative of indicia strokes of indicia to be formed on the article via a plurality of optical marking signals provided from the fiber marking laser to the optical scanner.

45. The laser marking system of claim 44 wherein a dummy pulse is provided via said controller prior to the initiation of a first marking signal for an initial indicia stroke of an indicia to be formed on the article surface when the marking system has been idle for a period of time so that a full marking stroke for the initial indicia stroke is generated.

46. The laser marking system of claim 44 wherein a preconditioning pulse is provided via said controller prior to the initiation of a first marking signal for an initial indicia stroke of an indicia to be formed on the article surface when the marking system has been idle for a period of time so that some residual energy is present in the fiber marking laser upon initiation of a first marking signal to the fiber marking laser.

47. A method of controlling energization in a laser marking system for marking indicia on a surface of an article, comprising the steps of:
providing a laser pump source optically coupled to pump a fiber marking laser having a single mode, rare earth doped core and providing an optical marking output for marking the article surface;
modulating the laser pump source in accordance with the indicia to be marked on the article surface with a pump signal representative of a predetermined marking intensity level of the optical marking output;
monitoring the marking output to detect the intensity level of the optical marking output;
comparing the detected marking output intensity level with the predetermined marking intensity level; and
changing a value of the pump signal to a value representative of the predetermined marking intensity level.

48. The method of claim 47 wherein the fiber marking laser comprises a double clad fiber and the laser pump source is optically coupled to an inner pump cladding of the double clad fiber.

49. The method of claim 48 wherein the inner pump cladding of the double clad fiber has a noncircular geometry.

50. The method of claim 47 wherein the noncircular geometry is a polygon shape.

51. A method of controlling energization in a laser marking system for marking indicia on a surface of an article where each indicia formed comprises one or more strokes, comprising the steps of:
providing a laser pump source optically coupled to a fiber marking laser;
providing a plurality of electrical marking signals, representative of the indicia strokes, to modulate the laser pump source providing a plurality of optical marking signals, representative of the indicia strokes;
launching the optical marking signals into the fiber marking laser to provide a plurality of laser pulses representative of the indicia strokes at its output for marking the article surface; and
providing an initial optical marking signal to the fiber marking laser prior to the initiation of one or more marking signals when the marking system has been idle for a period of time.

52. The method of claim 51 wherein the initial optical marking signal is a dummy pulse to provide for completion of a full indicia stroke for the first stroke of an indicia to be formed.

53. The method of claim 51 wherein the initial optical marking signal is a preconditioning pulse to provide some residual energy in the fiber marking laser upon initiation of a first marking signal to the fiber marking laser.

54. The method of claim 51 wherein the idle period of time is about one second or more.

55. The method of claim 51 comprising the further steps of:
providing a multiple dimensional scanner to receive the laser pulses from the fiber marking laser; and
synchronously scanning the pulses received from the fiber marking laser to provide marking indicia on the article surface.

* * * * *